US012606480B2

(12) United States Patent
Varanasi et al.

(10) Patent No.: US 12,606,480 B2
(45) Date of Patent: Apr. 21, 2026

(54) METHOD OF MAKING A REFLECTIVE COATED GLASS ARTICLE

(71) Applicant: PILKINGTON GROUP LIMITED, Lathom (GB)

(72) Inventors: Srikanth Varanasi, Ottawa Hills, OH (US); Neil Mcsporran, Liverpool (GB); Matthew Barrington Mahoney, Pinehurst, NC (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 18/117,549

(22) Filed: Mar. 6, 2023

(65) Prior Publication Data

US 2023/0202912 A1 Jun. 29, 2023

Related U.S. Application Data

(63) Continuation of application No. 16/756,608, filed as application No. PCT/GB2018/052859 on Oct. 5, 2018, now abandoned.

(Continued)

(51) Int. Cl.
*C03C 17/34* (2006.01)

(52) U.S. Cl.
CPC .. *C03C 17/3482* (2013.01); *C03C 2218/1525* (2013.01)

(58) Field of Classification Search
CPC ..................... C03C 17/3663; B60R 2001/1253
See application file for complete search history.

(56) References Cited

U.S. PATENT DOCUMENTS 4,100,330 A * 7/1978 Donley ............... C03C 17/3482
65/32.4
4,188,425 A 2/1980 Groth
(Continued)

FOREIGN PATENT DOCUMENTS

JP 2000347013 A 12/2000
JP 2014526432 A 10/2014
(Continued)

OTHER PUBLICATIONS

European Patent Office, International Search Report with Written Opinion in Application No. PCT/GB2018/052859, dated Dec. 7, 2018, 10 pages, European Patent Office, Rijswijk, Netherlands.

*Primary Examiner* — Alex A Rolland
(74) *Attorney, Agent, or Firm* — Marshall & Melhorn, LLC

(57) ABSTRACT
A method of making a reflective coated glass article includes providing a glass substrate. A first gaseous mixture is formed. The first gaseous mixture includes a silane compound and inert gas. The first gaseous mixture is delivered to a location above a major surface of the glass substrate to deposit a first coating layer directly on the major surface of the glass substrate. The first coating layer is deposited at a thickness of 5-50 nm. A second gaseous mixture is formed. The second gaseous mixture includes a silane compound, a radical scavenger and molecular oxygen. The second gaseous mixture is delivered to a location above the first coating layer. A second coating layer is deposited at a thickness of 5-50 nm over the first coating layer. The coated glass article exhibits a total visible light reflectance (Illuminant D65, ten degree observer) of 45% or more from a coated side of the coated glass article.

20 Claims, 3 Drawing Sheets

Related U.S. Application Data

(60) Provisional application No. 62/574,437, filed on Oct. 19, 2017.

(56) References Cited

U.S. PATENT DOCUMENTS

| | | | |
|---|---|---|---|
| 4,661,381 A | | 4/1987 | Callies et al. |
| 4,835,040 A | | 5/1989 | Callies et al. |
| 5,089,039 A | * | 2/1992 | Terneu .................. C03C 17/245 |
| | | | 65/60.8 |
| 5,106,671 A | | 4/1992 | Amberger et al. |
| 5,135,808 A | | 8/1992 | Kimock et al. |
| 5,216,551 A | | 6/1993 | Fujii |
| 5,401,305 A | | 3/1995 | Russo et al. |
| 5,505,989 A | | 4/1996 | Jenkinson |
| 5,521,765 A | | 5/1996 | Wolfe |
| 5,535,056 A | | 7/1996 | Caskey et al. |
| 5,576,885 A | | 11/1996 | Lowe et al. |
| 5,668,663 A | | 9/1997 | Varaprasad et al. |
| 5,700,305 A | | 12/1997 | Lowe et al. |
| 5,714,199 A | | 2/1998 | Gerhardinger et al. |
| 5,724,187 A | | 3/1998 | Varaprasad et al. |
| 5,747,169 A | | 5/1998 | Fan et al. |
| 5,749,931 A | * | 5/1998 | Goodman ........... C03C 17/3482 |
| | | | 427/166 |
| 5,751,489 A | | 5/1998 | Caskey et al. |
| 5,804,454 A | | 9/1998 | Mori et al. |
| 5,858,458 A | | 1/1999 | Jenkinson |
| 5,894,159 A | | 4/1999 | Mori et al. |
| 5,938,958 A | | 8/1999 | Goodman et al. |
| 5,956,181 A | * | 9/1999 | Lin ........................... B60R 1/12 |
| | | | 359/630 |
| 6,286,965 B1 | | 9/2001 | Caskey et al. |
| 6,733,891 B1 | | 5/2004 | Blair |
| 6,737,105 B2 | | 5/2004 | Richard |
| 6,902,813 B2 | | 6/2005 | O'Shaughnessy et al. |
| 7,004,592 B2 | | 2/2006 | Varaprasad et al. |
| 7,303,786 B2 | | 12/2007 | Chang |
| 7,309,527 B2 | | 12/2007 | O'Shaughnessy et al. |
| 7,494,231 B2 | | 2/2009 | Varaprasad et al. |
| 7,543,947 B2 | | 6/2009 | Varaprasad et al. |
| 7,572,017 B2 | | 8/2009 | Varaprasad et al. |
| 7,771,061 B2 | | 8/2010 | Varaprasad et al. |
| 7,871,169 B2 | | 1/2011 | Varaprasad et al. |
| 8,440,256 B2 | | 5/2013 | Lewis et al. |
| 8,492,874 B2 | | 7/2013 | Lan et al. |
| 8,551,841 B2 | | 10/2013 | Lee et al. |
| 8,652,586 B2 | | 2/2014 | Maschwitz |
| 8,663,806 B2 | | 3/2014 | Weber et al. |
| 8,784,933 B2 | | 7/2014 | Krzyak et al. |
| 8,937,721 B2 | | 1/2015 | Fujimaki et al. |
| 9,478,401 B2 | | 10/2016 | Maschwitz |
| 9,758,630 B2 | | 9/2017 | Kon et al. |
| 9,849,650 B2 | | 12/2017 | Weber et al. |
| 9,990,094 B2 | | 6/2018 | Lee et al. |
| 10,438,778 B2 | | 10/2019 | Maschwitz |
| 10,580,624 B2 | | 3/2020 | Maschwitz |
| 10,580,625 B2 | | 3/2020 | Maschwitz |
| 2012/0263936 A1 | | 10/2012 | Krzyak et al. |
| 2015/0155524 A1 | | 6/2015 | Liu |

FOREIGN PATENT DOCUMENTS

| | | |
|---|---|---|
| WO | WO92/05951 A1 | 4/1992 |
| WO | WO93/12892 A1 | 7/1993 |
| WO | WO96/40807 A1 | 12/1996 |
| WO | WO02/222516 A1 | 3/2002 |
| WO | WO2011/047840 A2 | 4/2011 |
| WO | WO2015/147295 A1 | 4/2017 |

* cited by examiner

METHOD OF MAKING A REFLECTIVE COATED GLASS ARTICLE

BACKGROUND

The invention relates to a method of making a coated glass article. More particularly, the invention relates to a method of making a reflective coated glass article.

Flat screen video displays are now found in many locations in public and commercial facilities and in private homes. It has been found to be desirable for such video displays to be less obtrusive when the display is not in operation. One way to accomplish this objective is to conceal the video display by giving it the appearance of an object that might commonly appear in a room such as a mirror. However, under certain conditions such as, for example, when there are relatively high levels of natural light illuminating a space and the video display is in operation, the quality of the video image is not as bright or sharp as would be desirable.

Thus, it would be advantageous to provide a method of making a coated glass article that has a mirror-like appearance for concealing a video display when the display is not in use and permits a video image from the display to be bright and sharp when the display is in use and utilized in areas with high levels of natural light.

BRIEF SUMMARY

Embodiments of a method of making a reflective coated glass article are provided. In an embodiment, the method comprises providing a glass substrate. A first gaseous mixture is formed. The first gaseous mixture comprises a silane compound and inert gas. The first gaseous mixture is delivered to a location above a major surface of the glass substrate to deposit a first coating layer directly on the major surface of the glass substrate. The first coating layer is deposited at a thickness of 5-50 nm. A second gaseous mixture is formed. The second gaseous mixture comprises a silane compound, a radical scavenger and molecular oxygen. The second gaseous mixture is delivered to a location above the first coating layer. A second coating layer is deposited at a thickness of 5-50 nm over the first coating layer. The coated glass article exhibits a total visible light reflectance (Illuminant D65, ten degree observer) of 45% or more from a coated side of the coated glass article.

In some embodiments, the glass substrate is moving.

In other embodiments, the glass substrate is a glass ribbon in a float glass manufacturing process.

Preferably, the first coating layer has a refractive index of 3.0 or more and the second coating layer has a refractive index of less than 1.6.

Preferably, the first coating layer comprises elemental silicon and the second coating layer comprises silicon dioxide. In an embodiment, the first coating layer consists essentially of elemental silicon. In another embodiment, the second coating layer consists essentially of silicon dioxide.

In an embodiment, the first gaseous mixture is fed through a first coating apparatus and the first gaseous mixture is discharged from the first coating apparatus. Preferably, the first gaseous mixture is formed prior to being fed through the first coating apparatus.

In another embodiment, the second gaseous mixture is fed through a second coating apparatus and the second gaseous mixture is discharged from the second coating apparatus.

In an embodiment, the first gaseous mixture consists essentially of the silane compound and inert gas.

In another embodiment, the second gaseous mixture comprises an oxygen-containing compound. Preferably, the oxygen-containing compound is water vapor.

In an embodiment, the thickness of the first coating layer is 10-30 nm.

In another embodiment, the thickness of the second coating layer is 10-50 nm.

In some embodiments, the second coating layer is deposited directly on the first coating layer and forms the outermost layer of the coating.

In certain embodiments, a third coating layer is deposited over the second coating layer, wherein the third coating layer is deposited at a thickness of 50 nm or less. In an embodiment, the third coating layer is deposited directly on the second coating layer. In another embodiment, the third coating layer defines an outer surface of the coated glass article. In some embodiments, the third coating layer comprises silicon oxide and fluorine.

In an embodiment, the coated glass article 10 exhibits a sheet resistance of greater than $1.0 \times 10^{10}$ ohm/sq.

In some embodiments, the total visible light reflectance (Illuminant D65, ten degree observer) exhibited by coated glass article from the coated side of the coated glass article is 45-75%.

In other embodiments, the coated glass article exhibits a total visible light transmittance (Illuminant D65, ten degree observer) of 40% or less from the coated side of the coated glass article. In an embodiment, the coated glass article exhibits a total visible light transmittance (Illuminant D65, ten degree observer) of 20-40% from the coated side of the coated glass article.

Preferably, the coated glass article exhibits an a* value (Illuminant D65, ten degree observer) from the coated side of the coated glass article in the range of −6 to 6 and a b* value (Illuminant D65, ten degree observer) from the coated side of the coated glass article in the range of −6 to 6.

In some embodiments, the a* value is negative and the b* value is positive.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the specific layers, articles, methods and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Figure 1:
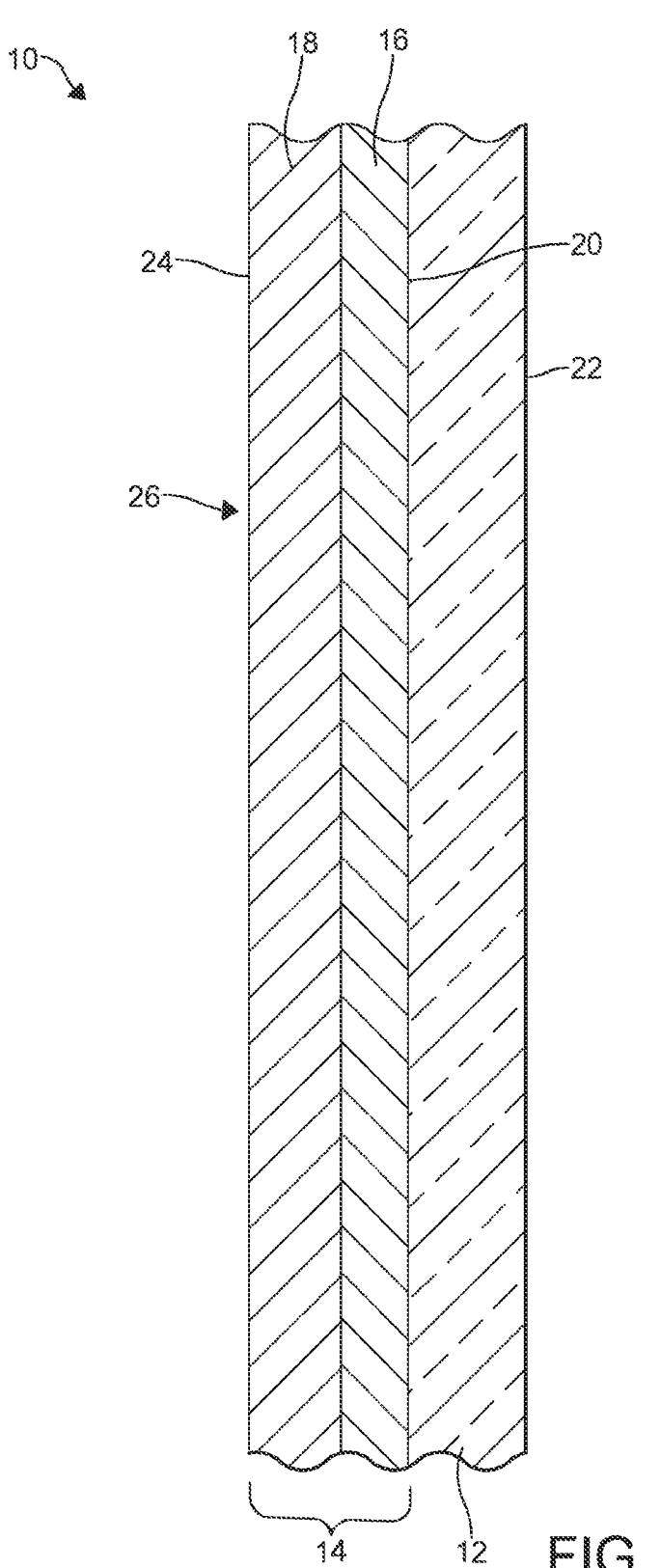
FIG. 1 is a sectional view of an embodiment of a coated glass article in accordance with an embodiment of the invention.

In an embodiment, a method of making a reflective coated glass article is provided. The embodiments of the reflective coated glass article 10 will be described below and with reference to FIGS. 1-3. The embodiments of the coated glass article 10 may be utilized as a single coated glass sheet. In one such embodiment, the coated glass article is utilized as a portion of a display assembly. Additionally, the embodiments of the coated glass article 10 may be utilized in, for example, a glazing and/or have architectural, electronic, residential, commercial, photovoltaic, automotive, and aerospace applications.

The method comprises providing a glass substrate. Embodiments of the glass substrate are illustrated in, for example, FIGS. 1 and 2. The transparency or absorption characteristics of the glass substrate may vary between embodiments of the coated glass article. Also, the color of the glass substrate can vary between embodiments of method. In some embodiments, the glass substrate may be tinted or colored. However, it is preferred that the glass substrate 12 is substantially clear and transparent to visible light.

The glass substrate may be of a conventional glass composition known in the art. In certain embodiments, the composition of the glass substrate 12 is selected to allow the coated glass article 10 to exhibit certain properties. Preferably, the glass substrate 12 is a soda-lime-silica glass. In this embodiment, the substrate 12 may be a float glass ribbon. However, the glass substrate may be of another composition such as, for example, a borosilicate or an aluminosilicate composition. Additionally, the glass substrate thickness may vary between embodiments.

Figure 3:
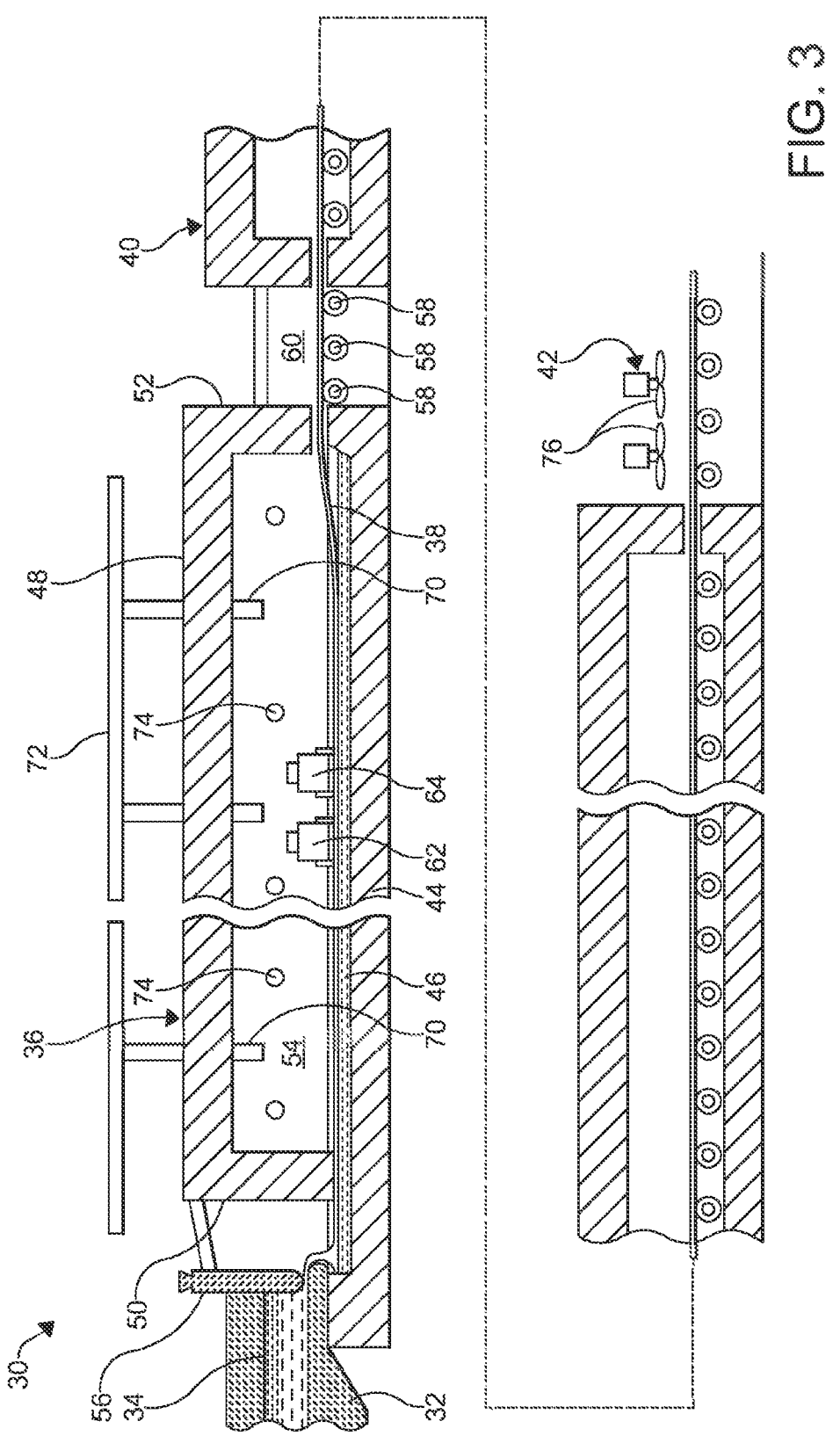
FIG. 3 is a schematic view, in vertical section, of an installation for practicing the float glass manufacturing process in accordance with an embodiment of the invention.

The method may be carried out in conjunction with the manufacture of the glass substrate 12. In an embodiment, the glass substrate 12 may be formed utilizing the well-known float glass manufacturing process. An example of a float glass manufacturing process is illustrated in FIG. 3. In this embodiment, the glass substrate may also be referred to as a glass ribbon 38. However, it should be appreciated that the method can be utilized apart from the float glass manufacturing process or well after formation and cutting of the glass ribbon.

A coating 14 is formed over the glass substrate 12. Preferably, the coating 14 is formed directly on a first major surface 20 of the glass substrate 12. When the coating 14 is formed directly on the glass substrate 12, there are no intervening coatings between the coating 14 and the glass substrate 12. A second major surface 22 of the glass substrate 12 and an opposite side of the coated glass article 10 may be uncoated.

In an embodiment, the coating 14 is pyrolytic. As used herein, the term "pyrolytic" may refer to a coating or a layer thereof that is chemically bonded to a glass substrate. Preferably, the coating 14 is formed by two or more chemical vapor deposition (CVD) processes. In certain embodiments, each CVD process is a dynamic deposition process. Thus, in these embodiments, the glass substrate 12 is moving at the time of forming the coating 14 thereon or thereover.

Preferably, the glass substrate 12 moves at a predetermined rate of, for example, greater than 3.175 m/min (125 in/min) as the coating 14 is being formed. In an embodiment, the glass substrate 12 is moving at a rate of between 3.175 m/min (125 in/min) and 12.7 m/min (600 in/min) as the coating 14 is being formed.

In certain embodiments, the glass substrate 12 is heated. In embodiments where the substrate 12 is a float glass ribbon, the coating 14 is preferably applied in the heated zone of the float glass manufacturing process. In an embodiment, the temperature of the glass substrate 12 is about 1100° F. (593° C.) or more when a coating 14 is formed thereover or directly thereon. In another embodiment, the temperature of the glass substrate 12 is between about 1100° F. (593° C.) and 1400° F. (760° C.) when the coating 14 is formed.

The coating 14 comprises a first coating layer 16 and a second coating layer 18. In certain embodiments, the coating 14 consists of the aforementioned coating layers 16, 18. In these embodiments, there are no intervening layers between the first coating layer 16 and the second coating layer 18.

The first coating layer 16 is deposited over and, preferably, directly on, the first major surface 20 of the glass substrate 12. Preferably, the first coating layer 16 is deposited over the first major surface 20 of the glass substrate 12 while the surface is at essentially atmospheric pressure. In this embodiment, the first coating layer 16 is deposited by an atmospheric pressure chemical vapor deposition (APCVD) process. In certain embodiments, the first coating layer 16 is pyrolytic.

In order to provide a coated glass article 10 that exhibits the desired visible light reflectance, it is preferred that the first coating layer 16 has a refractive index of 3.0 or more. In certain embodiments, it may be preferred that the first coating layer 16 has a refractive index of 3.4-3.5. It should be noted that the refractive index values referred to herein are for an average value across 400-780 nanometers (nm) of the electromagnetic spectrum.

Preferably, in these embodiments, the first coating layer 16 comprises elemental silicon (Si). However, the first coating layer 16 may comprise other materials having a suitable refractive index. Preferably, such other materials are also dielectric. When the first coating layer 16 comprises elemental silicon, the silicon layer may consist essentially of elemental silicon. In these embodiments, the silicon layer may include trace contaminants of, for example, carbon. As used herein, the phrase "trace amount" is an amount of a constituent of a coating layer that is not always quantitatively determinable because of its minuteness. However, it is preferred that the silicon layer is essentially free of contaminants such as carbon. In embodiments where the first coating layer 16 comprises elemental silicon, the thickness of the first coating layer 16 is 5-50 nm. Preferably, in these embodiments, the thickness of the first coating layer 16 is 10-30 nm. More preferably, the thickness of the first coating layer 16 is 10-25 nm.

The first coating layer 16 is deposited by forming a first gaseous mixture. In certain embodiments, the first gaseous mixture includes at least one reactant (precursor) compound suitable for forming the first coating layer at essentially atmospheric pressure. It is preferred that the at least one precursor compound suitable for use in the gaseous mixture is suitable for use in a CVD process. Such compounds may at some point be a liquid or a solid but are volatile such that they can be vaporized for use in the gaseous mixture. Once in a gaseous state, the at least one precursor compound can be included in a gaseous stream and utilized to deposit the first coating layer 16.

When the first coating layer 16 comprises elemental silicon, the first coating layer 16 may be deposited by forming a first gaseous mixture that comprises a silane compound. The silane compound is provided by delivering the silane compound from a source of the silane compound.

In an embodiment, the silane compound is monosilane ($SiH_4$). However, other silane compounds may be suitable for use in depositing the first coating layer 16.

The first gaseous mixture may also comprise a radical scavenger. Thus, a source of a radical scavenger may also be provided for supplying the radical scavenger. In an embodiment, the radical scavenger is a hydrocarbon gas. Preferably, the hydrocarbon gas is ethylene ($C_2H_4$) or propylene ($C_3H_6$).

However, it is preferred that the first coating layer is essentially free of contaminants such as, for example, carbon. Thus, in certain embodiments, it is preferred that a radical scavenger is not provided in the first gaseous mixture. In these embodiments, the first gaseous mixture may comprise the silane compound and inert gas. In certain embodiments, the first gaseous mixture may consist essentially of the silane compound and inert gas. The inert gas may be utilized as carrier or diluent gas. Suitable inert gases for inclusion in the first gaseous mixture include nitrogen ($N_2$), helium (He), and mixtures thereof.

In some embodiments, the silane compound is mixed with inert gas to form the first gaseous mixture. In certain embodiments, the first gaseous mixture is fed through a first coating apparatus and discharged from the first coating apparatus utilizing one or more gas distributor beams. Preferably, the first gaseous mixture is formed prior to being fed through the first coating apparatus. For example, the silane compound and inert gas may be mixed in a feed line connected to an inlet of the first coating apparatus. In other embodiments, the gaseous mixture may be formed within the first coating apparatus.

Preferably, the first coating apparatus extends transversely across the glass substrate and is provided at a predetermined distance there above. The coating apparatus is preferably located at, at least, one predetermined location. When the method is utilized in conjunction with the float glass manufacturing process, the coating apparatus is preferably provided within the float bath section thereof. However, the coating apparatus may be provided in the annealing lehr, and/or in the gap between the float bath and the annealing lehr.

The first gaseous mixture is delivered to a location above the first major surface 20 of the glass substrate 12. The first gaseous mixture is directed toward and along the glass substrate. Utilizing the first coating apparatus aids in delivering the first gaseous mixture to a location above the glass substrate 12 and directing the first gaseous mixture toward and along the glass substrate. Preferably, the first gaseous mixture is directed toward and along the glass substrate in a laminar flow.

The first gaseous mixture reacts at or near the glass substrate to deposit the first coating layer thereover. Utilizing the embodiments of the first gaseous mixture described above results in the deposition of a high quality coating layer on the glass substrate. In particular, the first coating layer exhibits excellent coating thickness uniformity and can be deposited at commercial viable deposition rates.

The second coating layer 18 is deposited over and, preferably, directly on the first coating layer 16. When the second coating layer 18 is deposited directly on the first coating layer 16, there are no intervening layers between the first coating layer 16 and the second coating layer 18. In certain embodiments, the second coating layer 18 is the outermost coating layer of the coated glass article 10. In these embodiments, the second coating layer 18 defines an outer surface 24 of the coated glass article 10.

The second coating layer 18 comprises a dielectric material. Also, in order to provide a coated glass article 10 that exhibits the desired visible light reflectance, it is preferred that the second coating layer 18 has a refractive index that is less than the refractive index of the first coating layer 16. In certain embodiments, the refractive index of the second coating layer is 1.6 or less. In these embodiments, it is preferred that the second coating layer 18 comprises silicon dioxide ($SiO_2$). Silicon dioxide is a preferred material because it is dielectric and has a refractive index of about 1.46. In some embodiments, the second coating layer 18 consists essentially of silicon dioxide.

Preferably, the second coating layer 18 is pyrolytic. In embodiments where the second coating layer 18 comprises silicon dioxide, the thickness of the second coating layer 18 is 5-50 nm. Preferably, for these embodiments, the thickness of the second coating layer 18 is 10-50 nm.

Preferably, the second coating layer 18 is deposited by forming a second gaseous mixture. In certain embodiments, the second gaseous mixture includes precursor compounds suitable for forming the second coating layer 18 at essentially atmospheric pressure. It is preferred that the precursor compounds suitable for use in the second gaseous mixture are suitable for use in a CVD process. Such compounds may at some point be a liquid or a solid but are volatile such that they can be vaporized for use in the second gaseous mixture. Once in a gaseous state, the precursor compounds can be included in a gaseous stream and utilized to form the second coating layer 18.

When the second coating layer 18 comprises silicon dioxide, the second gaseous mixture comprises a silane compound. The second gaseous mixture also comprises a radical scavenger and molecular oxygen ($O_2$). In an embodiment, the second gaseous mixture consists essentially of the silane compound, radical scavenger, and molecular oxygen. Further, in some embodiments, the second gaseous mixture may comprise an oxygen-containing compound. In one such embodiment, the second gaseous mixture consists essentially of the silane compound, radical scavenger, molecular oxygen, and an oxygen-containing compound.

In an embodiment, the silane compound is monosilane ($SiH_4$). However, other silane compounds are suitable for use in depositing the second coating layer 18. For example, disilane ($Si_2H_6$) is a suitable silane compound for use in depositing the second coating layer 18.

The silane compound utilized in the second gaseous mixture may be pyrophoric. When molecular oxygen alone is added to the second gaseous mixture, which comprises a pyrophoric silane compound, silicon dioxide is produced. However, the silicon dioxide is produced at unacceptably high rates and an explosive reaction may result. Known methods of preventing such a reaction result in the deposition of coatings at very low, commercially impractical rates. Known methods are also limited in the amount of silane compound and oxygen which can be contained in the gaseous mixture, as too high a concentration results in gas phase reaction of the elements, and no coating layer being produced. Therefore, it is preferred that the second gaseous mixture includes the radical scavenger.

The presence of the radical scavenger allows the silane compound to be mixed with molecular oxygen and/or an oxygen-containing compound without undergoing ignition and premature reaction at the operating temperatures. The radical scavenger further provides control of and permits optimization of the kinetics of the reaction above, near, and/or on the glass substrate 12. In an embodiment, the radical scavenger is a hydrocarbon gas. Preferably, the hydrocarbon gas is ethylene ($C_2H_4$) or propylene ($C_3H_6$).

Molecular oxygen can be provided as a part of a gaseous composition such as air or in a substantially purified form. In embodiments where the second gaseous mixture comprises an oxygen-containing compound, it is preferred that the oxygen-containing compound is water ($H_2O$) vapor. In an embodiment, the second gaseous mixture comprises both molecular oxygen and water vapor. In this embodiment, the second gaseous mixture may comprise more water vapor than molecular oxygen.

The second gaseous mixture may also comprise one or more inert gases utilized as carrier or diluent gas. Suitable inert gases include nitrogen ($N_2$), helium (He), and mixtures thereof. Thus, sources of the one or more inert gases, from which separate supply lines may extend, may be provided.

In an embodiment, the second gaseous mixture is formed by mixing the silane compound, radical scavenger, and molecular oxygen. In some embodiments, the second gaseous mixture is formed by mixing the silane compound, radical scavenger, molecular oxygen, and oxygen-containing compound. In certain embodiments, after mixing, the second gaseous mixture is fed through a second coating apparatus and discharged from the second coating apparatus utilizing one or more gas distributor beams. Preferably, the second gaseous mixture is formed prior to being fed through the second coating apparatus. For example, the silane compound, molecular oxygen, and radical scavenger may be mixed in a feed line connected to an inlet of the second coating apparatus. In other embodiments, the second gaseous mixture may be formed within the second coating apparatus.

The second gaseous mixture is delivered to a location above the first coating layer 16. The second gaseous mixture is directed toward and along the glass substrate 12. Utilizing the second coating apparatus aids in delivering the second gaseous mixture to a location above the first coating layer 16 and directing the second gaseous mixture toward and along the glass substrate 12. Preferably, the second gaseous mixture is directed toward and along the glass substrate 12 in a laminar flow.

The second gaseous mixture reacts at or near the glass substrate 12 to form the second coating layer 18 thereover. Utilizing the embodiments of the second gaseous mixture described above results in the deposition of a high quality coating layer over the glass substrate 12 and first coating layer 16. In particular, the second coating layer 18 exhibits excellent coating thickness uniformity.

The embodiments of the method described above provide a coated glass article 10 that is highly reflective. The high reflectivity exhibited by the coated glass article 10 allows a display such as, for example, a flat screen television to be concealed by the reflectance and mirror-like appearance of the coated glass article 10 when the display is not in use. Also, when the display is in use, a display image is visible through the coated glass article 10 and the quality of the display image visible through the article 10 is bright and sharp under a broad spectrum of ambient light conditions. In some embodiments, it may be preferred that the coating 14 faces out and away from the display.

The reflectivity of the coated glass article will be further discussed below with respect to its total visible light reflectance. For describing the coated glass article 10, total visible light reflectance will refer to the percentage of visible light reflected from the coated glass article 10 as measured from the side 26 of the coated glass article 10 that has the coating 14 formed on the surface of the glass substrate 12 (coated side). Also, for describing the coated glass article 10, total visible light transmittance will refer to the percentage of visible light passing through the coated glass article 10 as measured from the coated side 26 of the coated glass article 10. The total visible light reflectance and total visible light transmittance will be described herein according to the CIELAB color scale system using Illuminant D65, ten degree observer.

Advantageously, the coated glass article 10 exhibits a total visible light reflectance (Illuminant D65, ten degree observer) of 45% or more. Preferably, the coated glass article 10 exhibits a total visible light reflectance (Illuminant D65, ten degree observer) of 50% or more. In certain embodiments, the coated glass article 10 exhibits a total visible light reflectance (Illuminant D65, ten degree observer) of 60% or more. Preferably, in these embodiments, the coated glass article 10 exhibits a total visible light reflectance (Illuminant D65, ten degree observer) of 65% or more. In these embodiments, the coated glass article 10 may exhibit a total visible light reflectance (Illuminant D65, ten degree observer) of 75% or less. Thus, for example, the coated glass article 10 may exhibit a total visible light reflectance (Illuminant D65, ten degree observer) of 45-75%. Total visible light reflectance can be measured using a commercially available spectrophotometer such as the Perkin Elmer Lambda 950.

Additionally, in an embodiment, the coated glass article 10 exhibits a total visible light transmittance (Illuminant D65, ten degree observer) of 40% or less. Preferably, the coated glass article 10 exhibits a total visible light transmittance (Illuminant D65, ten degree observer) of 35% or less. In certain embodiments, the coated glass article 10 exhibits a total visible light transmittance (Illuminant D65, ten degree observer) of 30% or less. In further embodiments, the coated glass article 10 may exhibit a total visible light transmittance (Illuminant D65, ten degree observer) of 25% or less. In these embodiments, the coated glass article 10 may exhibit a total visible light transmittance (Illuminant D65, ten degree observer) of at least 20%. Thus, for example, the coated glass article 10 may exhibit a total visible light transmittance (Illuminant D65, ten degree observer) of 20-40%. Total visible light transmittance can be measured using a commercially available spectrophotometer such as the Perkin Elmer Lambda 950.

The coated glass article 10 may also exhibit other properties that are advantageous. For example, it should also be noted that the coated glass article 10 not only exhibits a high total visible light reflectance but may also exhibit a neutral color for the visible light reflected from the coated side 26 of the coated glass article 10 when viewed at a 90 degree angle incident to the coated glass article 10. The color of the visible light reflected from the coated side 26 of the coated glass article 10 may be referred to herein as "reflected color." The reflected color will be described herein according to the CIELAB color scale system using Illuminant D65, ten degree observer. Reflected color can be measured using a commercially available spectrophotometer such as the Perkin Elmer Lambda 950. Also, for the purpose of describing the embodiments of the coated glass article 10 disclosed herein, a neutral color for the visible light reflected from the coated side 26 of the coated glass article 10 has an a* value (Illuminant D65, ten degree observer) in the range of −6 to 6 and a b* value (Illuminant D65, ten degree observer) in the range of −6 to 6.

Preferably, the coated glass article 10 exhibits a reflected color in a range from about −4 to 3 for the a* value (Illuminant D65, ten degree observer) and a range from about −3 to 3 for the b* value (Illuminant D65, ten degree observer). More preferably, the coated glass article 10 exhibits a reflected color in a range from about −3 to 3 for the a* value (Illuminant D65, ten degree observer) and a range from about −3 to 3 for the b* value (Illuminant D65, ten degree observer). In these embodiments, it is preferred that the coated glass article 10 exhibits a reflected color in which the a* value is negative and the b* value is positive. It should be appreciated that a negative a* value indicates a green color hue and a negative b* value indicates a yellow color hue for the reflected color exhibited by the coated glass article 10.

Also, the coated glass article 10 may exhibit a low haze value. As discussed herein, the term "haze" refers to the percentage of incident visible light that scatters when passing through the coated glass article 10. Also, as discussed herein, the haze exhibited by the coated glass article 10 is measured from the coated side 26 of the coated glass article 10. In an embodiment, the coated glass article 10 may exhibit haze of 0.5% or less. Preferably, the coated glass article 10 exhibits a haze of 0.4% or less. In some embodiments, the haze exhibited by the coated glass article 10 is 0.1-0.4%. The haze exhibited by the coated glass article 10 can be measured using a commercially available haze meter such as the BYK-Gardner haze-gard plus.

In certain embodiments, the coated glass article 10 may be utilized in a touch screen electronic device. The touch screen electronic device may be of the projected capacitive touch, optical, or the infrared variety. When the coated glass article 10 is utilized in a touch screen electronic device, the coated glass article 10 is provided in the device such that the coating 14 faces out from the device and, when the touch screen electronic device is in use, the user controls the device by touching the coating 14. In these embodiments, it is preferred that the coated glass article 10 exhibits a high sheet resistance. In one such embodiment, the coated glass article 10 exhibits a sheet resistance of, for example, greater than $1.0 \times 10^{10}$ ohm/sq. Preferably, the coated glass article 10 exhibits a sheet resistance of $1.0 \times 10^{12}$ ohm/sq. or more. The coated glass article exhibits a sheet resistance of, for example, greater than $1.0 \times 10^{10}$ ohm/sq. by proper selection of the composition and thickness of each of the first coating layer and the second coating layer. The sheet resistance exhibited by coated glass article 10 is measured on the coated side 26 of the coated glass article 10. The sheet resistance exhibited by coated glass article 10 can be measured using a 4-point probe method and a commercially available 4-point probe.

Figure 2:
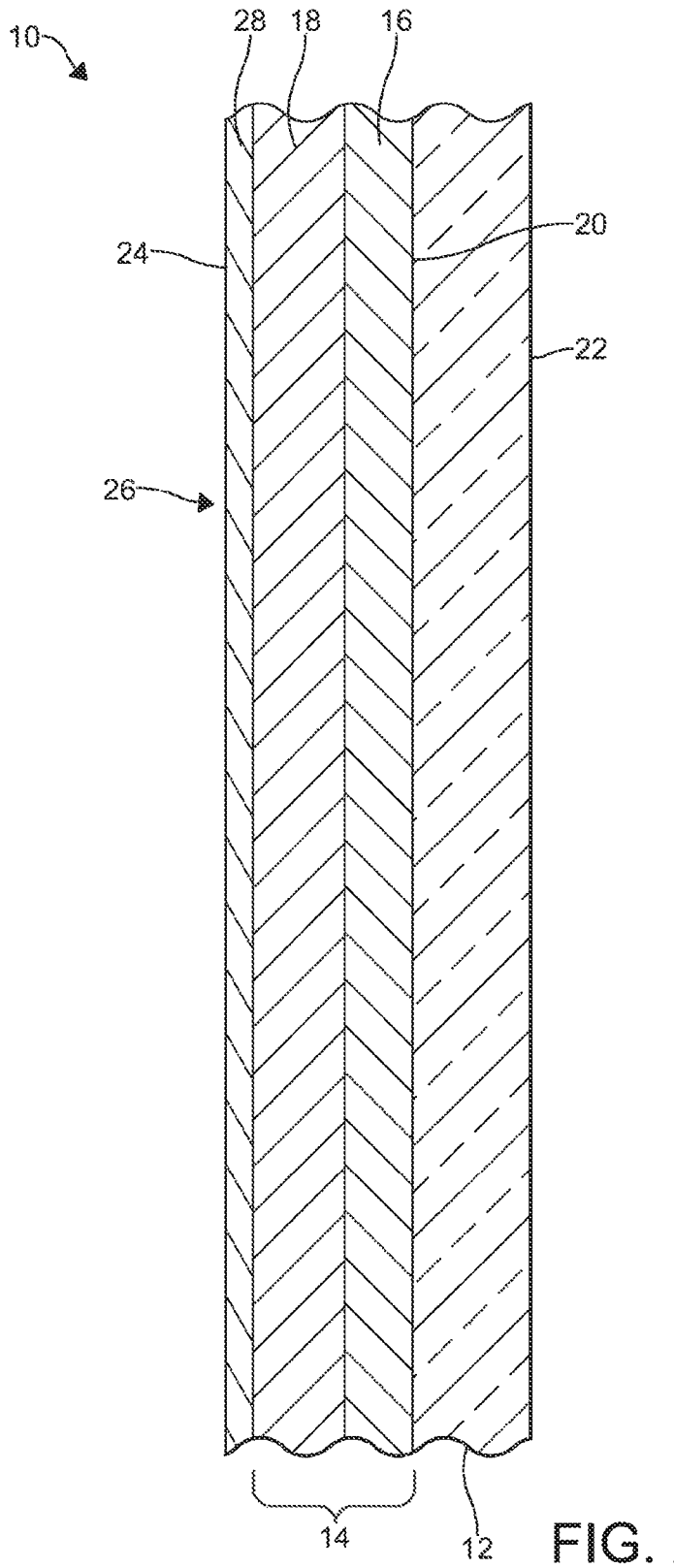
FIG. 2 is a sectional view of another embodiment of a coated glass article in accordance with another embodiment of the invention.

Furthermore, in certain embodiments such as, for example, when the coated glass article 10 is utilized in a touch screen electronic device, the coated glass article 10 may comprise a third coating layer 28. With reference now to FIG. 2, the third coating layer 28 is deposited over and, preferably, directly on the second coating layer 18. When the third coating layer 28 is deposited directly on the second coating layer 18, there are no intervening layers between the second coating layer 18 and the third coating layer 28. In these embodiments, the third coating layer 28 may be the outermost coating layer of the coated glass article 10. In these embodiments, the third coating layer 28 may define the outer surface 24 of the coated glass article 10.

In certain embodiments, the third coating layer 28 can be utilized to allow the coated glass article 10 to exhibit hydrophobic and/or oleophobic properties. Advantageously, when the coated glass article 10 exhibits hydrophobic properties, the coated glass article 10 repels water and resists soiling. When the coated glass article 10 exhibits oleophobic properties, the coated glass article 10 resists oil and fingerprints being deposited on the coated glass article 10. In these embodiments, the third coating layer 28 may comprise silicon, oxygen, and fluorine. In one such embodiment, the third coating layer 28 comprises silicon oxide and fluorine. In these embodiments, the third coating layer 28 may be deposited by utilizing a fluorosilane compound or a fluoroalkylsilane compound. When the third coating layer 28 is provided, the third coating layer 28 may be deposited at a thickness of 50 nm or less. In certain embodiments, it is preferred that the thickness of the third coating layer 28 is 5-10 nm. In these embodiments, the third coating layer 28 may be deposited utilizing, for example, a sputter deposition process or a solution deposition process such as, for example, a dipping process or a spinning process. However, the third coating layer 28 may be deposited using other deposition processes.

As discussed, above, the coating 14 may be formed in conjunction with the manufacture of the glass substrate 12 in the well-known float glass manufacturing process. The float glass manufacturing process is typically carried out utilizing a float glass installation such as the installation 30 depicted in the FIG. 3. However, it should be understood that the float glass installation 30 described herein is only illustrative of such installations.

As illustrated in FIG. 3, the float glass installation 30 may comprise a canal section 32 along which molten glass 34 is delivered from a melting furnace, to a float bath section 36 wherein the glass substrate is formed. In this embodiment, the glass substrate will be referred to as a glass ribbon 38. The glass ribbon 38 is a preferable substrate on which the coating is formed. However, it should be appreciated that the glass substrate is not limited to being a glass ribbon.

The glass ribbon 38 advances from the bath section 36 through an adjacent annealing lehr 40 and a cooling section 42. The float bath section 36 includes: a bottom section 44 within which a bath of molten tin 46 is contained, a roof 48, opposite side walls (not depicted) and end walls 50, 52. The roof 48, side walls and end walls 50, 52 together define an enclosure 54 in which a non-oxidizing atmosphere is maintained to prevent oxidation of the molten tin 46.

In operation, the molten glass 34 flows along the canal 32 beneath a regulating tweel 56 and downwardly onto the surface of the tin bath 46 in controlled amounts. On the molten tin surface, the molten glass 34 spreads laterally under the influence of gravity and surface tension, as well as certain mechanical influences, and it is advanced across the tin bath 46 to form the glass ribbon 38. The glass ribbon 38 is removed from the bath section 36 over lift out rolls 58 and is thereafter conveyed through the annealing lehr 40 and the cooling section 42 on aligned rolls. The deposition of the coating 14 preferably takes place in the float bath section 36, although it may be possible for deposition to take place further along the glass production line, for example, in the gap 60 between the float bath 36 and the annealing lehr 40, or in the annealing lehr 40.

As illustrated in the FIG. 3, two coating apparatuses 62, 64 are shown within the float bath section 36. The coating 14 may be formed utilizing the coating apparatuses 62, 64 with each coating apparatuses utilized to deposit one of the coating layers 16, 18. For example, in an embodiment, the first coating layer 16 is deposited utilizing the first coating apparatus 62. In this embodiment, the second coating layer 22 is deposited utilizing the second coating apparatus 64.

A suitable non-oxidizing atmosphere, generally nitrogen or a mixture of nitrogen and hydrogen in which nitrogen predominates, is maintained in the float bath section 36 to prevent oxidation of the molten tin 46 comprising the float bath. The atmosphere gas is admitted through conduits 70 operably coupled to a distribution manifold 72. The non-oxidizing gas is introduced at a rate sufficient to compensate for normal losses and maintain a slight positive pressure, on the order of between about 0.001 and about 0.01 atmosphere above ambient atmospheric pressure, so as to prevent infiltration of outside atmosphere. For purposes of the describing the invention, the above-noted pressure range is considered to constitute normal atmospheric pressure.

Preferably, the coating 14 is formed at essentially atmospheric pressure. Thus, the pressure of the float bath section 36, annealing lehr 40, and/or in the gap 60 between the float bath 36 and the annealing lehr 40 may be essentially atmospheric pressure.

Heat for maintaining the desired temperature regime in the float bath section 36 and the enclosure 54 is provided by radiant heaters 74 within the enclosure 54. The atmosphere within the lehr 40 is typically atmospheric air, as the cooling section 42 is not enclosed and the glass ribbon 38 is therefore open to the ambient atmosphere. The glass ribbon 38 is subsequently allowed to cool to ambient temperature. To cool the glass ribbon 38, ambient air may be directed against the glass ribbon 38 as by fans 76 in the cooling section 42. Heaters (not depicted) may also be provided within the annealing lehr 40 for causing the temperature of the glass ribbon 38 to be gradually reduced in accordance with a predetermined regime as it is conveyed therethrough.

EXAMPLES

The following examples are presented solely for the purpose of further illustrating and disclosing the embodiments of the method of making the coated glass article.

Examples of coated glass articles within the scope of the invention are described below and illustrated in TABLE 1. In TABLE 1, the coated glass articles within the scope of the invention are Ex 1-Ex 4. A comparative example, not considered to be a part of the invention, is also described below and illustrated in TABLE 1.

The comparative example is designated as C1 in TABLE 1. The following experimental conditions are applicable to C1. For C1, a coating was deposited on a first major surface of a glass substrate as the glass substrate was being formed and moving in conjunction with the float glass manufacturing process. The glass substrate was of a soda-lime-silica composition. The coating was formed by depositing a first coating layer, second coating layer, third coating layer and fourth coating layer. Each coating layer was formed by utilizing an APCVD process.

For C1, the first coating layer was pyrolytic and comprised tin oxide and was deposited at a thickness of 29.7 nm. The first coating layer was deposited directly on the first major surface of the glass substrate. After depositing the first coating layer, the second coating layer was deposited at a thickness of 84.4 nm. The second coating layer was pyrolytic and comprised silicon dioxide. The second coating layer was deposited directly on the first coating layer. After depositing the second coating layer, the third coating layer was deposited at a thickness of 29.8 nm. The third coating layer was pyrolytic and comprised tin oxide. The third coating layer was deposited directly on the second coating layer. After depositing the third coating layer, the fourth coating layer was deposited at a thickness of 35.8 nm. The fourth coating layer was pyrolytic comprised titanium dioxide. The fourth coating layer was deposited directly on the third coating layer. Thus, the coated glass article of C1 was of a glass/$SnO_2$/$SiO_2$/$SnO_2$/$TiO_2$ arrangement.

The following experimental conditions are applicable to Ex 1-Ex 4. For Ex 1-Ex 4, a coating was deposited on a first major surface of a glass substrate as the glass substrate was being formed and moving in conjunction with the float glass manufacturing process. The glass substrate was of a soda-lime-silica composition. The coating was formed by depositing a first coating layer and a second coating layer. Each coating layer was formed by utilizing an APCVD process.

For Ex 1-Ex 4, the first coating layer was pyrolytic and comprised elemental silicon. For Ex 1-Ex 4, the first coating layer was deposited by forming a first gaseous mixture. For Ex 1-Ex 4, each first gaseous mixture comprised monosilane (SiH$_4$) and inert gas. For Ex 1, the mole percentage (mol %) of monosilane in the first gaseous mixture was 1.4, with the remainder of the gaseous mixture comprising inert gas. For Ex 2, the first gaseous mixture comprised 2.5 mol % monosilane with the remainder of the gaseous mixture comprising inert gas. For Ex 3, the first gaseous mixture comprised 2.5 mol % monosilane with the remainder of the gaseous mixture comprising inert gas. For Ex 4, the first gaseous mixture comprised 1.4 mol % monosilane with the remainder of the gaseous mixture comprising inert gas. For each of Ex 1-Ex 4, the monosilane and inert gas was mixed to form the first gaseous mixture. Each first gaseous mixture was fed through a coating apparatus before being delivered to a location above a first major surface of a respective glass substrate of Ex1-Ex 4.

Each first coating layer was deposited directly on the first major surface of the respective glass substrate. For Ex 1, the first coating layer was deposited at a thickness of 16 nm. For Ex 2, the first coating layer was deposited at a thickness of 22 nm. For Ex 3, the first coating layer was deposited at a thickness of 21.6 nm. For Ex 4, the first coating layer was deposited at a thickness of 16.3 nm. The first coating layer was deposited directly on the first major surface of the glass substrate.

After depositing the first coating layer, the second coating layer was deposited. The second coating layer was pyrolytic and comprised silicon dioxide. For Ex 1-Ex 4, the second coating layer was deposited by forming a second gaseous mixture. For each of Ex 1-Ex 4, the second gaseous mixture comprised monosilane (SiH$_4$), molecular oxygen (O$_2$), ethylene (C$_2$H$_4$), and inert gas. For Ex 1, the second gaseous mixture comprised 0.16 mol % monosilane, 0.7 mol % molecular oxygen, and 1.0 mol % ethylene, with the remainder of the gaseous mixture comprising inert gas. For Ex 2, the second gaseous mixture comprised 0.4 mol % monosilane, 1.6 mol % molecular oxygen, and 2.4 mol % ethylene, with the remainder of the gaseous mixture comprising inert gas. For Ex 3, the second gaseous mixture comprised 0.35 mol % monosilane, 1.4 mol % molecular oxygen, and 2.1 mol % ethylene, with the remainder of the gaseous mixture comprising inert gas. For Ex 4, the second gaseous mixture comprised 0.2 mol % monosilane, 0.8 mol % molecular oxygen, and 1.2 mol % ethylene, with the remainder of the gaseous mixture comprising inert gas. For each of Ex 1-Ex 4, the precursor compounds and inert gas were mixed to form the second gaseous mixture. Each second gaseous mixture was fed through a coating apparatus before being delivered to a location above a respective first coating layer of Ex 1-Ex 4.

Each second coating layer was deposited directly on the respective first coating layer. For Ex 1, the second coating layer was deposited at a thickness of 32.4 nm. For Ex 2, the second coating layer was deposited at a thickness of 14.2 nm. For Ex 3, the second coating layer was deposited at a thickness of 20.9 nm. For Ex 4, the second coating layer was deposited at a thickness of 38.9 nm. Thus, the coated glass articles of Ex 1-Ex 4 are of a glass/Si/SiO$_2$ arrangement.

The thicknesses of the coating layers of Ex 1-Ex 4 and C1, which are reported above, were calculated via optical modeling. The haze, total visible light transmittance (Tvis) (Illuminant D65, ten degree observer), total visible light reflectance (Rf) (Illuminant D65, ten degree observer) and reflected color (Ra*, Rb*) (Illuminant D65, ten degree observer) of the coated glass articles of Ex 1-Ex 4 and C1 are reported in TABLE 1. The haze was measured on the coated side of each coated glass article using a BYK-Gardner haze-gard plus and is expressed as a percentage. The total visible light transmittance and was measured on the coated side of each coated glass article using a Perkin Elmer Lambda 950 spectrophotometer and is expressed as a percentage. The total visible light reflectance and reflected color were measured on the coated side of each coated glass article using a Perkin Elmer Lambda 950 spectrophotometer. The total visible light reflectance is expressed as a percentage.

TABLE 1

| Examples | Haze | Tvis | Rf | Ra* | Rb* |
|---|---|---|---|---|---|
| C1 | 0.84 | 52.5 | 44.6 | −7.8 | −2.8 |
| Ex 1 | 0.36 | 34.2 | 52.9 | −2.98 | −1.95 |
| Ex 2 | 0.35 | 22.3 | 66.6 | −2.39 | 0.10 |
| Ex 3 | 0.35 | 30.3 | 62.6 | −3.85 | −0.54 |
| Ex 4 | 0.31 | 39.3 | 53.1 | −3.58 | −0.31 |

As shown in TABLE 1, the coated glass articles of Ex1-Ex 4 exhibit improved reflectance properties when compared with the coated glass article of C1. For example, the coated glass articles of Ex 1-Ex 4 each exhibited a total visible light reflectance (Illuminant D65, ten degree observer) of more than 45%. In stark contrast, the coated glass article of C1 exhibited a total visible light reflectance (Illuminant D65, ten degree observer) of less than 45%. In fact, the coated glass articles of Ex 1-Ex 4 each exhibited a total visible light reflectance (Illuminant D65, ten degree observer) of more than 50% and the coated glass article of Ex 2 exhibited a total visible light reflectance (Illuminant D65, ten degree observer) of more than 65%. It should also be noted that the coated glass articles of Ex 1-Ex 4 exhibited a neutral color for the visible light reflected from the coated side of each coated glass article.

Also, the method of making the coated glass articles of Ex 1-Ex 4 exhibited other advantageous properties. For example, the coated glass articles of Ex 1-Ex 4 only required a first gaseous mixture to deposit the first coating layer and a second gaseous mixture to deposit the second coating layer. Thus, the coated glass articles of Ex 1-Ex 4 are less expensive and complex to manufacture than the coated glass article of C1, which required four gaseous mixtures. Additionally, the method of making the coated glass articles of Ex 1-Ex 4 allowed the coated glass article to each exhibit a haze below 0.4%. In stark contrast, the method utilized to make the coated glass article of C1, resulted in a coated glass article that exhibited a haze of 0.84%. Furthermore, the coated glass articles of Ex 1-Ex 4 each exhibited sheet resistances that would allow them to be utilized in projected capacitive touch screen devices. For example, the coated glass article of Ex 3 exhibited a sheet resistance of 3.04× $10^{12}$ ohm/sq. and the coated glass article of Ex 4 exhibited a sheet resistance of 1.22×$10^{13}$ ohm/sq. The sheet resistances reported for the coated glass articles of Ex 3 and the coated glass article of Ex 4 were measured on the coated side of each coated glass article using a 4-point probe method and a commercially available 4-point probe.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims, which follow.

What is claimed is:

1. A method of making a reflective coated glass article capable of displaying a video image therethrough, comprising:

providing a glass substrate;

forming a first gaseous mixture comprising a silane compound and inert gas and feeding the first gaseous mixture through a first coating apparatus and discharging the first gaseous mixture from the first coating apparatus to a location above a major surface of the glass substrate to deposit a first coating layer directly on the major surface of the glass substrate, wherein the first coating layer is deposited at a thickness of 5-50 nm; and forming a second gaseous mixture comprising a silane compound, molecular oxygen, and a radical scavenger, and feeding the second gaseous mixture through a second coating apparatus and discharging the second gaseous mixture from the second coating apparatus to a location above the first coating layer where a non-oxidizing atmosphere is maintained, and depositing a second coating layer at a thickness of 5-50 nm over the first coating layer, wherein the second coating layer is deposited directly on the first coating layer and forms the outermost layer of the coated glass article, wherein the coated glass article exhibits a total visible light reflectance (Illuminant D65, ten degree observer) of 45% or more from the coated side of the coated glass article, and wherein the reflective coated glass article has the appearance of a mirror for concealing a video display from view through the reflective coated glass article when the video display is not in use while permitting an image from the video display to be clearly viewed through the reflective coated glass article when the video display is in use.

2. The method of claim 1, wherein the glass substrate is a glass ribbon in a float glass manufacturing process.

3. The method of claim 1, wherein the glass substrate is moving.

4. The method of claim 1, wherein the first coating layer has a refractive index of 3.0 or more and the second coating layer has a refractive index of less than 1.6.

5. The method of claim 1, wherein the first coating layer comprises elemental silicon and the second coating layer comprises silicon dioxide.

6. The method off claim 1, wherein the thickness of the first coating layer is 10-30 nm.

7. The method of claim 1, wherein the first gaseous mixture consists essentially of the silane compound and inert gas.

8. The method of claim 1, wherein the second gaseous mixture comprises an oxygen-containing compound.

9. The method of claim 8, wherein the oxygen-containing compound is water vapor.

10. The method of claim 1, wherein the thickness of the second coating layer is 10-50 nm.

11. The method of claim 1, wherein the coated glass article exhibits a sheet resistance of greater than $1.0 \times 10^{10}$ ohm/sq. and/or wherein the coated glass article exhibits a total visible light transmittance (Illuminant D65, ten degree observer) of 40% or less from the coated side of the coated glass article.

12. The method of claim 1, wherein the total visible light reflectance (Illuminant D65, ten degree observer) exhibited by coated glass article from the coated side of the coated glass article is 45-75% and/or wherein the coated glass article exhibits an a* value (Illuminant D65, ten degree observer) from the coated side of the coated glass article in the range of −6 to 6 and a b* value (Illuminant D65, ten degree observer) from the coated side of the coated glass article in the range of −6 to 6.

13. The method of claim 1, wherein the first coating layer consists essentially of elemental silicon and/or wherein the second coating layer consists essentially of silicon dioxide.

14. The method of claim 1, wherein the first gaseous mixture is formed prior to being fed through the first coating apparatus.

15. The method of claim 1, wherein the coated glass article exhibits a total visible light transmittance (Illuminant D65, ten degree observer) of 20-40% from the coated side of the coated glass article and/or wherein the a* value is negative and the b* value is positive.

16. The method of claim 1, wherein the first coating layer consists essentially of elemental silicon and wherein the second coating layer consists essentially of silicon dioxide.

17. The method of claim 1, wherein the first coating layer is deposited at a thickness of 5-22 nm.

18. A method of displaying a video image comprising:
providing a glass substrate;
forming a first gaseous mixture comprising a silane compound and inert gas and feeding the first gaseous mixture through a first coating apparatus and discharging the first gaseous mixture from the first coating apparatus to a location above a major surface of the glass substrate to deposit a first coating layer directly on the major surface of the glass substrate, wherein the first coating layer is deposited at a thickness of 5-50 nm; and forming a second gaseous mixture comprising a silane compound, molecular oxygen, and a radical scavenger, and feeding the second gaseous mixture through a second coating apparatus and discharging the second gaseous mixture from the second coating apparatus to a location above the first coating layer where a non-oxidizing atmosphere is maintained, and depositing a second coating layer at a thickness of 5-50 nm over the first coating layer to form a reflective coated glass article, wherein the second coating layer is deposited directly on the first coating layer and forms the outermost layer of the coated glass article, and wherein the coated glass article exhibits a total visible light reflectance (Illuminant D65, ten degree observer) of 45% or more from the coated side of the coated glass article; and providing a video display such that the first and second coating layers face out and away from the video display;

wherein the reflective coated glass article has the appearance of a mirror for concealing the video display from view through the reflective coated glass article when the video display is not in use while permitting an image from the video display to be clearly viewed through the reflective coated glass article when the video display is in use.

19. The method of claim 18, wherein the first coating layer comprises elemental silicon and the second coating layer comprises silicon dioxide.

20. The method of claim 18, wherein the first coating layer is deposited at a thickness of 5-22 nm.

* * * * *